United States Patent
Koubiadis et al.

(10) Patent No.: US 11,073,607 B2
(45) Date of Patent: Jul. 27, 2021

(54) WIDEBAND RADAR SYSTEMS, APPARATUSES, AND METHODS

(71) Applicant: Lockheed Martin Corporation, Bethesda, MD (US)

(72) Inventors: Fotis P. Koubiadis, Bordentown, NJ (US); Nicholas J. Romano, Collingswood, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 309 days.

(21) Appl. No.: 16/202,737

(22) Filed: Nov. 28, 2018

(65) Prior Publication Data

US 2020/0166625 A1    May 28, 2020

(51) Int. Cl.
| | | |
|---|---|---|
| G01S 13/30 | (2006.01) | |
| G01S 13/20 | (2006.01) | |
| G01S 7/292 | (2006.01) | |
| G01S 7/288 | (2006.01) | |
| G01S 13/28 | (2006.01) | |

(52) U.S. Cl.
CPC .............. G01S 13/30 (2013.01); G01S 7/288 (2013.01); G01S 7/2921 (2013.01); G01S 7/2926 (2013.01); G01S 13/20 (2013.01); G01S 13/282 (2013.01)

(58) Field of Classification Search
CPC ........ G01S 13/30; G01S 7/288; G01S 7/2921; G01S 7/2926; G01S 13/20; G01S 13/282; G01S 31/524; G01S 13/534; G01S 13/931
See application file for complete search history.

(56) References Cited

U.S. PATENT DOCUMENTS

| | | | | |
|---|---|---|---|---|
| 5,151,702 A | * | 9/1992 | Urkowitz | G01S 13/284 342/116 |
| 5,376,939 A | * | 12/1994 | Urkowitz | G01S 7/42 342/134 |
| 5,990,824 A | * | 11/1999 | Harrison | G01S 13/91 342/159 |
| 6,184,820 B1 | * | 2/2001 | Kratzer | G01S 7/34 342/160 |
| 6,639,546 B1 | * | 10/2003 | Ott | G01S 13/20 342/129 |
| 7,420,502 B2 | * | 9/2008 | Hartzstein | G01S 13/343 342/70 |
| 7,724,181 B2 | * | 5/2010 | Natsume | G01S 13/426 342/108 |
| 7,928,897 B2 | * | 4/2011 | Ishii | G01S 13/46 342/105 |
| 8,390,506 B2 | * | 3/2013 | Focke | G01S 13/345 342/70 |
| 8,390,507 B2 | * | 3/2013 | Wintermantel | H01Q 9/0407 342/70 |

(Continued)

*Primary Examiner* — Peter M Bythrow
(74) *Attorney, Agent, or Firm* — Michael Best & Friedrich LLP

(57) ABSTRACT

Radar signals are generated to have signal characteristics that define multiple sub-pulses in each of a plurality of pulse repetition intervals (PRIs) of a single radar dwell. Electromagnetic radiation is emitted according to the radar signals and the emitted electromagnetic radiation is sensed as radar return signals over a receive interval in each PRI. Coherent integration is performed on a set of the radar return signals and non-coherent integration is performed on another set of the radar return signals.

20 Claims, 7 Drawing Sheets

(56) References Cited

U.S. PATENT DOCUMENTS

| | | | | |
|---|---|---|---|---|
| 8,654,006 B2* | 2/2014 | Landez | ................... | G01S 7/032 |
| | | | | 342/103 |
| 8,902,103 B2* | 12/2014 | Kim | ..................... | G01S 13/345 |
| | | | | 342/70 |
| 8,976,061 B2* | 3/2015 | Chowdhury | ....... | H01Q 21/0087 |
| | | | | 342/175 |
| 9,075,138 B2* | 7/2015 | Song | ........................ | G01S 13/22 |
| 9,612,323 B2* | 4/2017 | Ishimori | ................ | G08G 1/166 |
| 2005/0156780 A1* | 7/2005 | Bonthron | ............. | G01S 13/931 |
| | | | | 342/107 |
| 2005/0225481 A1* | 10/2005 | Bonthron | ............. | H01Q 1/3233 |
| | | | | 342/175 |
| 2009/0284407 A1* | 11/2009 | Aoyagi | .................. | G01S 13/18 |
| | | | | 342/110 |
| 2012/0242530 A1* | 9/2012 | Luebbert | ............... | G01S 13/343 |
| | | | | 342/70 |
| 2012/0306687 A1* | 12/2012 | Matsuo | ................. | G01S 13/284 |
| | | | | 342/189 |
| 2013/0147655 A1* | 6/2013 | Kishigami | ........... | G01S 13/284 |
| | | | | 342/135 |
| 2018/0003802 A1* | 1/2018 | LaPat | .................... | G01S 7/4004 |
| 2019/0011547 A1* | 1/2019 | Han | ...................... | G01S 13/931 |
| 2020/0003881 A1* | 1/2020 | Hjortland | ............... | G01S 7/282 |
| 2020/0191934 A1* | 6/2020 | Maniwa | ................. | G01S 13/24 |

* cited by examiner

WIDEBAND RADAR SYSTEMS, APPARATUSES, AND METHODS

The disclosed subject matter relates to radar and more specifically wideband radar that implements both coherent and non-coherent integration.

BACKGROUND

Radar is a detection technique that uses radio waves to determine range, angle and/or velocity of a target. To that end, radar systems implement various signal processing operations to improve the probability of target detection in the presence of radar clutter and interference.

Radar systems that employ coherent processing for clutter mitigation suffer from blind-ranges, blind-speeds, range ambiguity, and Doppler ambiguity. Multiple pulse integration at a constant carrier frequency supports detection of targets in clutter at medium pulse repetition frequency (PRF). Multiple bursts with PRF diversity are required to resolve ambiguities and fill blind ranges and velocities.

Radar systems use non-coherent integration processing, for example, for ranges over which clutter is not an issue. Multiple pulse integration with pulse repetition interval (PRI) to PRI frequency diversity supports long range detection performance at low PRF and some mitigation of electromagnetic interference.

Typical surveillance radar systems employ relatively narrow-band antennas, waveform generators and receivers. Thus, to transmit, receive and process radar signals in both coherent and non-coherent integration modes, narrowband radar resources are allocated for corresponding coherent and non-coherent integration processing streams. Such operation requires additional radar timeline using PRF, radio frequency (RF) and integration diversity to provide unambiguous visibility over desired range/Doppler extents.

Such an extended timeline is illustrated in FIG. 1, where multiple radar dwells are sequentially scheduled to realize target detectability, target visibility, and clutter suppression using a conventional narrow-band radar design. As used herein, the term "dwell" refers to the time that the radar system transmits, receives, and processes radar returns on a particular search volume for the purpose of detecting targets therein. The term "search volume," as used herein, refers to radar coverage over beam angle, range, and Doppler extent. As illustrated in FIG. 1, a dwell K uses a narrow band receiver/exciter carrier switched at each PRI, and a subsequent dwell K+1 uses a narrow band receiver/exciter constant carrier for all PRI. The pulses in dwell K are non-coherently integrated, and the pulses in dwell K+1 are integrated coherently. Such an extended timeline can be inefficient.

SUMMARY

Radar signals are generated to have signal characteristics that define multiple sub-pulses in each of a plurality of pulse repetition intervals (PRIs) of a single radar dwell. Electromagnetic radiation is emitted according to the radar signals, and the emitted electromagnetic radiation is sensed as radar return signals over a receive interval in each PRI. Coherent integration is performed on a set of the radar return signals, and non-coherent integration is performed on another set of the radar return signals.

According to one or more embodiments of the disclosed subject matter, a radar apparatus can be provided. The radar apparatus can comprise: a waveform generator configured to generate radar signals having signal characteristics that define multiple sub-pulses in each of a plurality of pulse repetition intervals (PRIs) of a single radar dwell; an antenna communicatively coupled to the waveform generator and configured to emit electromagnetic radiation according to the radar signals; a receiver communicatively coupled to the antenna and configured to sense the emitted electromagnetic radiation as radar return signals over a receive interval in each PRI; and a signal processor communicatively coupled to the receiver and configured to perform coherent integration on a set of the radar return signals and non-coherent integration on another set of the radar return signals.

Additionally, one or more embodiments of the disclosed subject matter can provide or implement a radar method. The radar method can comprise generating radar signals having signal characteristics that define multiple sub-pulses in each of a plurality of pulse repetition intervals (PRIs) of a single radar dwell; emitting electromagnetic radiation according to the radar signals; sensing the emitted electromagnetic radiation as radar return signals over a receive interval in each PRI; and performing coherent integration on a set of the radar return signals and non-coherent integration on another set of the radar return signals.

One or more embodiments of the disclosed subject matter can also provide and/or be implemented with a tangible, non-transitory computer readable medium having encoded thereon processor instructions that when executed by one or more processors of a radar compels the radar to perform a method comprising: generating radar signals having signal characteristics that define multiple sub-pulses in each of a plurality of pulse repetition intervals (PRIs) of a single radar dwell; emitting electromagnetic radiation according to the radar signals; sensing the emitted electromagnetic radiation as radar return signals over a receive interval in each PRI; and performing coherent integration on a set of the radar return signals and non-coherent integration on another set of the radar return signals.

The preceding summary is to provide an understanding of some aspects of the disclosure. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

DETAILED DESCRIPTION

Figure 1:
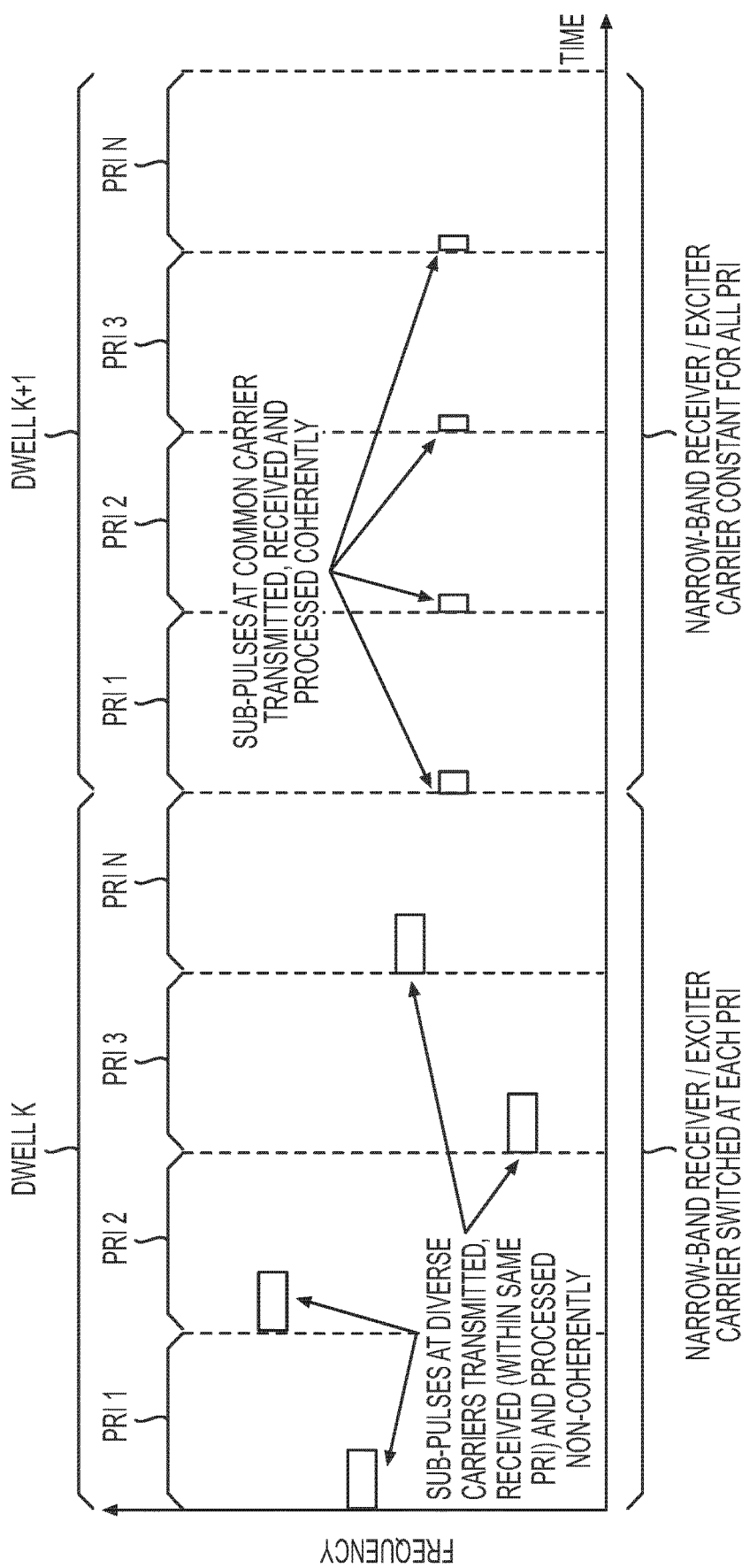
FIG. 1 is a diagram illustrating an extended radar timeline of conventional narrow-band radar systems.

The present inventive concept is best described through certain embodiments thereof, which are described in detail herein with reference to the accompanying drawings, wherein like reference numerals refer to like features throughout. It is to be understood that the general inventive concept is not limited to the illustrative embodiments described below and the following descriptions should be read in such light.

Additionally, the word exemplary is used herein to mean, "serving as an example, instance or illustration." Any embodiment of construction, process, design, technique, etc., designated herein as exemplary is not necessarily to be construed as preferred or advantageous over other such embodiments. Particular quality or fitness of the examples indicated herein as exemplary is neither intended nor should be inferred.

Figure 2:
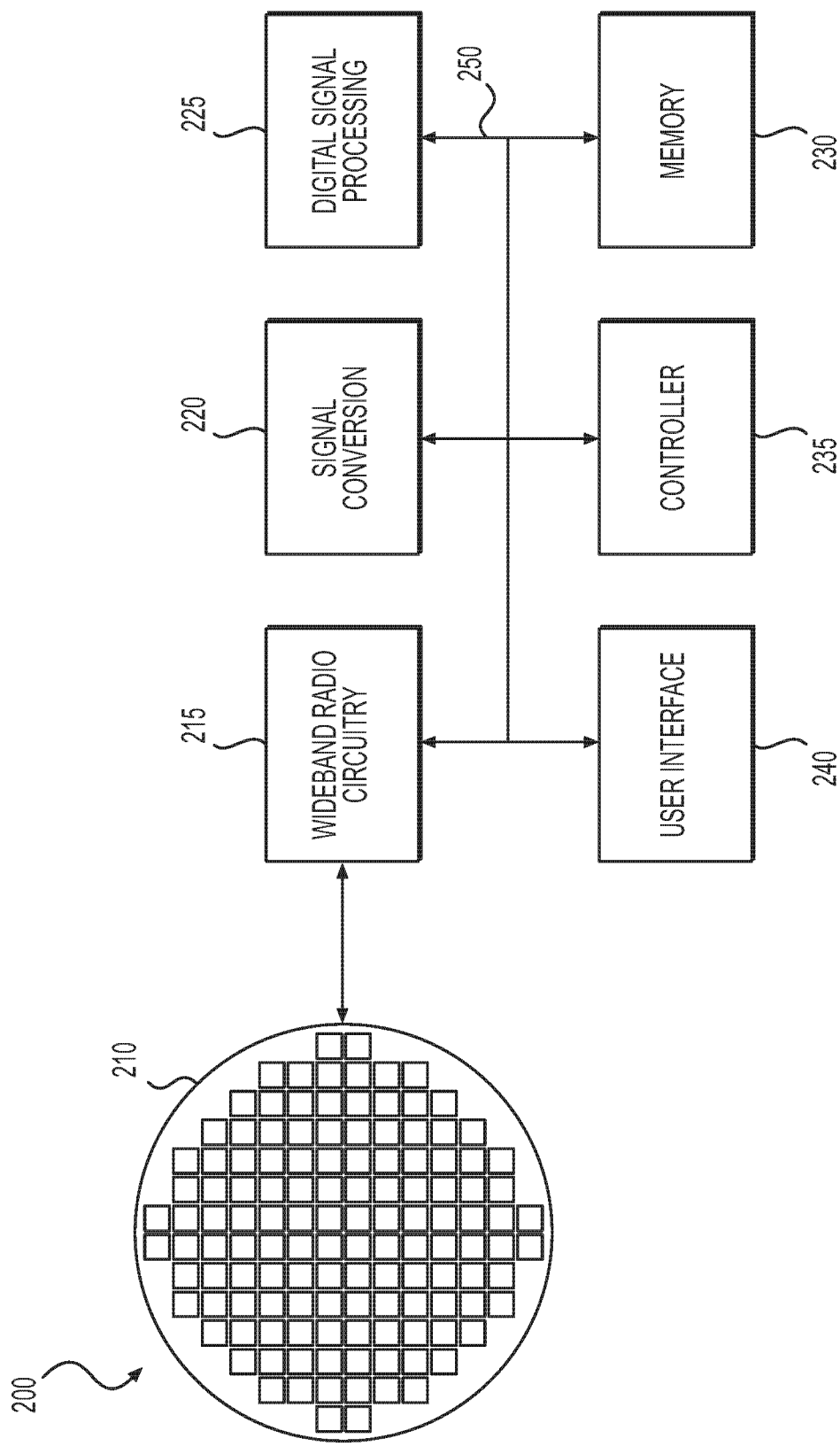
FIG. 2 is a schematic block diagram of an exemplary radar platform on which the disclosed subject matter can be embodied.

FIG. 2 is a schematic block diagram of an exemplary radar platform 200 on which the disclosed subject matter can be embodied. Radar platform 200 is one possible configuration of functional components by which a radar system according to the disclosed subject matter is physically manifested. As illustrated in the figure, radar platform 200 may include a wideband (WB) antenna 210 communicatively coupled to a WB radio circuitry component 215. WB radio circuitry component 215 may be coupled to a signal conversion component 220, a digital signal processing component 225, a memory component 230, a controller component 235 and a user interface component 240 via a signal bus 250. Signal bus 250 can represent multiple different connections and signal conductors between components including both analog (transmission lines, cables, circuit traces, etc.) and digital (multiple signal conductors carrying data words, serial data lines, etc.) implementations.

Exemplary WB antenna 210 serves as both transmit and receive antenna and manifests sufficient total and instantaneous bandwidth to provide the spatial and frequency response necessary to realize the modes of operation described herein. WB antenna 210 may emit and sense radio frequency (RF) signals over a range of carrier frequencies, as will be detailed below. The disclosed subject matter is not limited to particular antenna designs; in certain embodiments, WB antenna 210 is an array antenna, and may be a phased array by which transmit and receive beams are formed.

Exemplary WB radio circuitry component 215 implements the radio interface of the radar and comprises the RF components, e.g., oscillators, mixers, filters, circulators, amplifiers, etc., from which suitable RF circuits are constructed that realize transmit and receive functionality of the radar. Wideband radio circuitry component 215 may be implemented in the analog domain, the mixed analog/digital domain or the digital domain. Wideband radio circuitry component 215 realizes several user-configurable, front-end radar functions on transmitted signals and corresponding radar return signals. Wideband radio circuitry component 215 is further dynamically re-configurable, such as in response to feedback signals described below.

Exemplary signal conversion component 220 performs signal conversion between the analog and digital domains. As such, signal conversion component 220 may comprise analog-to-digital converters (ADCs) and digital-to-analog converters (DACs) that can operate at sufficient conversion rates (e.g., 1 Gigasample/s) to realize the wideband features described herein. Moreover, in certain embodiments, signal conversion component 220 may convert analog RF signals to digital intermediate frequency (IF) signals and vice-versa.

Exemplary digital signal processing component 225 is constructed or otherwise configured to perform various processes on radar signals in the digital domain. Such processes may include waveform generation, filtering, clutter/noise mitigation, target detection, etc. More specific details of example signal processing techniques of the disclosed subject matter are provided below. Digital signal processing component may be realized through suitable microprocessors, digital signal processors, application specific processors, field programmable gate arrays (FPGAs), general purpose processors (GPPs), graphics processor units (GPUs) etc., and combinations of such processing architectures.

Exemplary controller component 235 provides overall control of radar platform 200 and may be realized by a suitable microprocessor or microcontroller. Controller component 235 may control radar operation in terms of certain radar parameters, e.g., beam direction, pulse repetition frequency (PRF), pulse width, pulse compression, gain, and so on. Additionally, controller component 235 may coordinate interoperation of components of radar platform 200 so as to implement the techniques described herein.

Memory component 230 may store processor-executable instructions for both digital signal processing component 225 and controller component 235 that define the various control and signal processing operations described herein. Additionally, memory component 230 may include data storage space in which data undergoing data processing may be stored. Memory component 230 may comprise random access memory, read-only memory, persistent memory (hard drives, flash drives, etc.), buffer memory, cache memory and so on.

Exemplary user interface component 240 realizes the display and control mechanisms by which a radar operator visualizes radar returns and reports, and exercises operator control over radar platform 200. The disclosed subject matter is not limited to particular user interface implementations, various examples of which are known to skilled radar artisans.

Figure 3:
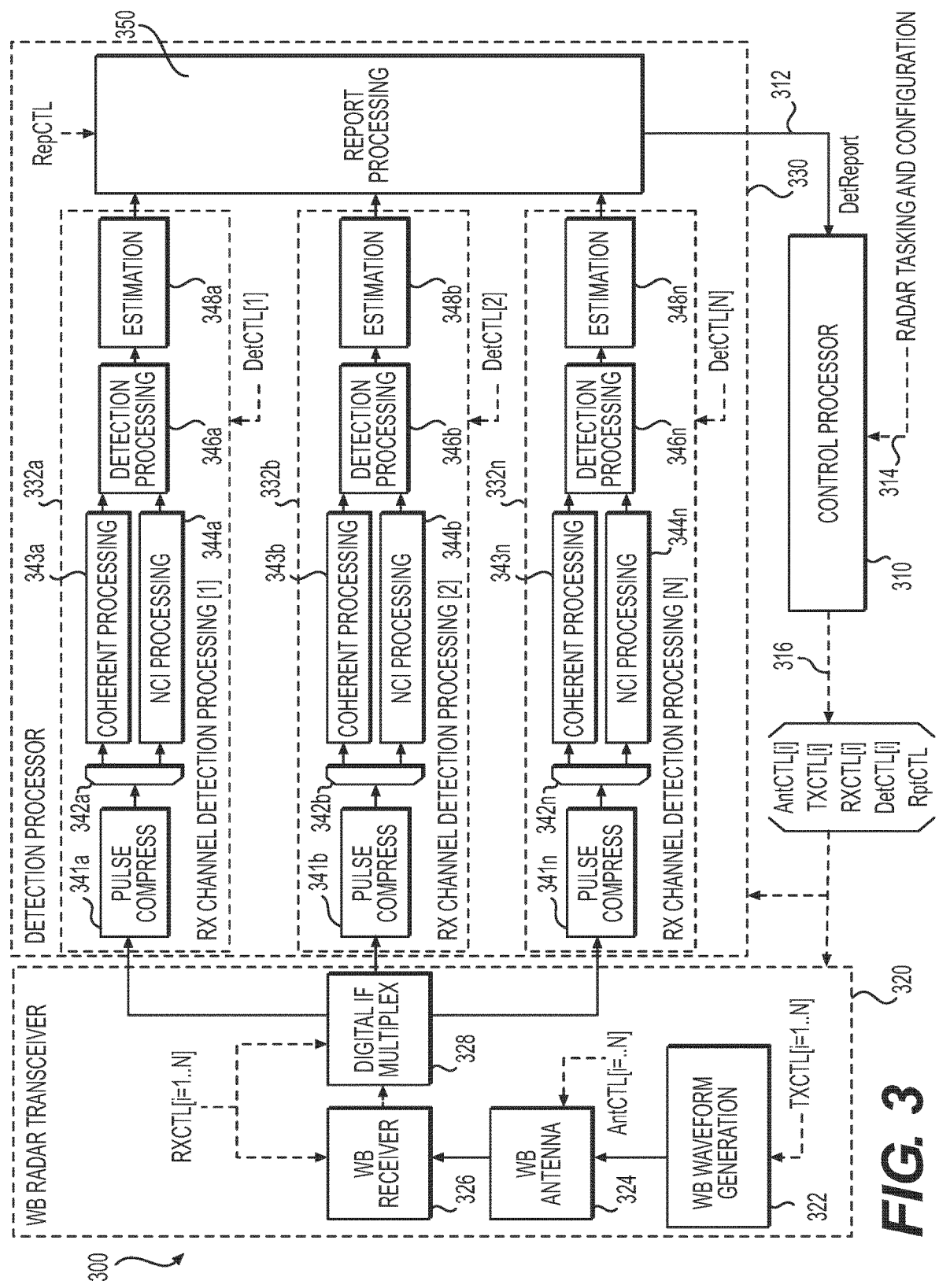
FIG. 3 is a schematic block diagram of an exemplary radar by which the disclosed subject matter can be embodied.

FIG. 3 is a schematic block diagram of an exemplary radar 300 by which the disclosed subject matter can be embodied. Radar 300 may be realized on resources of radar platform 200 described above. For purposes of description and not limitation, radar 300 is illustrated as comprised of three subsystems: a control processor 310 that might be realized on controller 235, a wideband radar transceiver 320 that might be realized on WB antenna 210, WB radio circuitry 215, signal conversion component 220 and digital signal processor component 225, and a detection processor 330 that might be realized on digital signal processor 225.

Control processor 310 may be provided radar tasking and configuration control data 314 from an external source, such as a radar operator, a configuration data file or a command and control system. In accordance with the radar tasking and configuration control data 314, control processor 310 may provide control messages/signals 316 to the WB radar transceiver 320 and detection processor 330 to sense the environment over a desired range and Doppler coverage interval. Control processor 310 may control the number of detection processing chains 332 as well as what radar returns are processed in each detection processing chain 332.

As the environment is sensed, control processor 310 may receive feedback from detection report feedback 312 output by the detection processor 330, which can be used to optimize use of wideband radar transceiver 320 and minimize expenditure of radar resources. In one example, the detection report feedback 312 may indicate interference in the form of natural environment clutter. The selection of dwell length and PRF can be adapted to further mitigate the clutter. In another example, the detection report feedback 312 may indicate interference in the form of electronic signals. The selection of RF carrier can be adapted to avoid external interference signals. Such adaptation may include optimized dwell times, PRIs, frequencies, and processing parameters to maintain target detectability in sensed clutter and electronic interference. Through effective control of the waveforms radiated and spectrum received by WB radar transceiver 320, the radar can provide optimal target detectability and coverage, while simultaneously mitigating clutter and electronic interference.

Example WB radar transceiver 320 is embodied by a WB waveform generator 322, a WB antenna 324, a WB receiver 326 and a digital intermediate frequency (IF) multiplexer 328. The WB radar transceiver 320 is controlled via control signals/messages 316 provided by control processor 310.

Exemplary WB waveform generator 322 generates the radar signal waveforms that are radiated by WB antenna 324. For example, WB waveform generator 322 may output 1 to $N_{TX}$ waveforms in each PRI in accordance with the control signals/messages 316 provided by control processor 310. Each of the 1 to $N_{TX}$ waveforms generated and radiated by the WB radar transceiver 320 has at least one distinct: antenna beam pointing location, PRI, pulse width, modulation scheme and radio frequency (RF) carrier to distinguish the waveforms from one another. When so embodied, the radar returns from a particular transmitted waveform can be subjected to particular signal processing by detection processor 330, as discussed below.

The 1 to $N_{TX}$ waveforms generated and radiated by the wideband radar transceiver 320 are reflected and modulated by the environment (including targets and radar clutter) and received back at WB radar transceiver 320 as radar return signals. WB antenna 324 is configured to receive radar return signals at antenna beam positions in accordance with the control signals/messages 316 provided by control processor 310. The RF radar return signals are output from the WB antenna 324 and provided to the WB receiver 326. WB receiver 326 gates and samples the radar return for multiple receive intervals with starting and stopping ranges in accordance with the control signals/messages 316 provided by control processor 320. Each receive interval resides in a pulse repetition interval (PRI) of a distinct length and has a distinct sampling start-time and sampling end-time.

WB receiver 326 provides digitized radar return data to the digital IF multiplexer 328. Digital IF multiplexer 328 digitally filters and, as necessary, decimates the digitized radar return to form 1 to $N_{RX}$ IF channels. Each of the 1 to $N_{RX}$ digital IF channels is configured to sample a unique RF carrier at a unique output sample rate and bandwidth. The digitized radar return data output by the WB radar transceiver 320 for the 1 to $N_{RX}$ digital IF channels is output to detection processor 330.

Example detection processor 330 is embodied by multiple, configurable detection processing chains 332a-332n, representatively referred to herein as detection processing chain(s) 332, and a report processing component 350. Detection processor 330 may be instantiated, configured and controlled in response to messages/signals 316 provided by control processor 310. In this control, detection processor 330 is configured to perform detection processing on the 1 to $N_{RX}$ digital IF channels output by the digital IF multiplexer 328 in the WB radar transceiver 320. In this way, detection processor 330 performs 1 to N parallel detection processing chains 332 across receive interval outputs within a dwell by the WB radar transceiver 320. Each detection processing chain 332 for each receive interval is distinctly configured by control processor 310 through control messages/signals 316.

As illustrated in FIG. 3, detection processing chains 332 comprise respective pulse compression components 341a-341n, representatively referred to herein as pulse compression component(s) 341, integration selector components 342a-342n, representatively referred to herein as integration selector component(s) 342, coherent integration processing components 343a-343n, representatively referred to herein as coherent integration processing component(s) 343, non-coherent integration processing components 344a-344n, representatively referred to herein as non-coherent integration processing component(s) 344, detection processing components 346a-346n, representatively referred to herein as detection processing component(s) 346, and estimation components 348a-348n, representatively referred to herein as estimation component(s) 348. Radar return data processed by detection processing chains 332 are assembled by report processing component 350, which indicates range to target as well as a target's radial velocity. Such parameters reported by report processing component 350 may be provided to a user, such as through user interface component 240 in FIG. 2, as well as to control processor 310 in the form of feedback.

Radar return data from digital IF multiplexer 328 may be provided to pulse compression components 341, which are matched to the waveform generated by WB waveform generator 322. Integration selectors 342 represent mechanisms by which coherent integration, performed by coherent processing component 343, and/or non-coherent integration performed by non-coherent processing component 344, are selected. Detection processing components 346 comprise detection processing thresholds/logic. Estimation components 348 determine reportable range extent and target range, angle and Doppler estimation through suitably configured thresholds and logic. The configuration of the detection processing chains permits for simultaneous coverage of complementary range and Doppler intervals within a single radar dwell.

Figure 4:
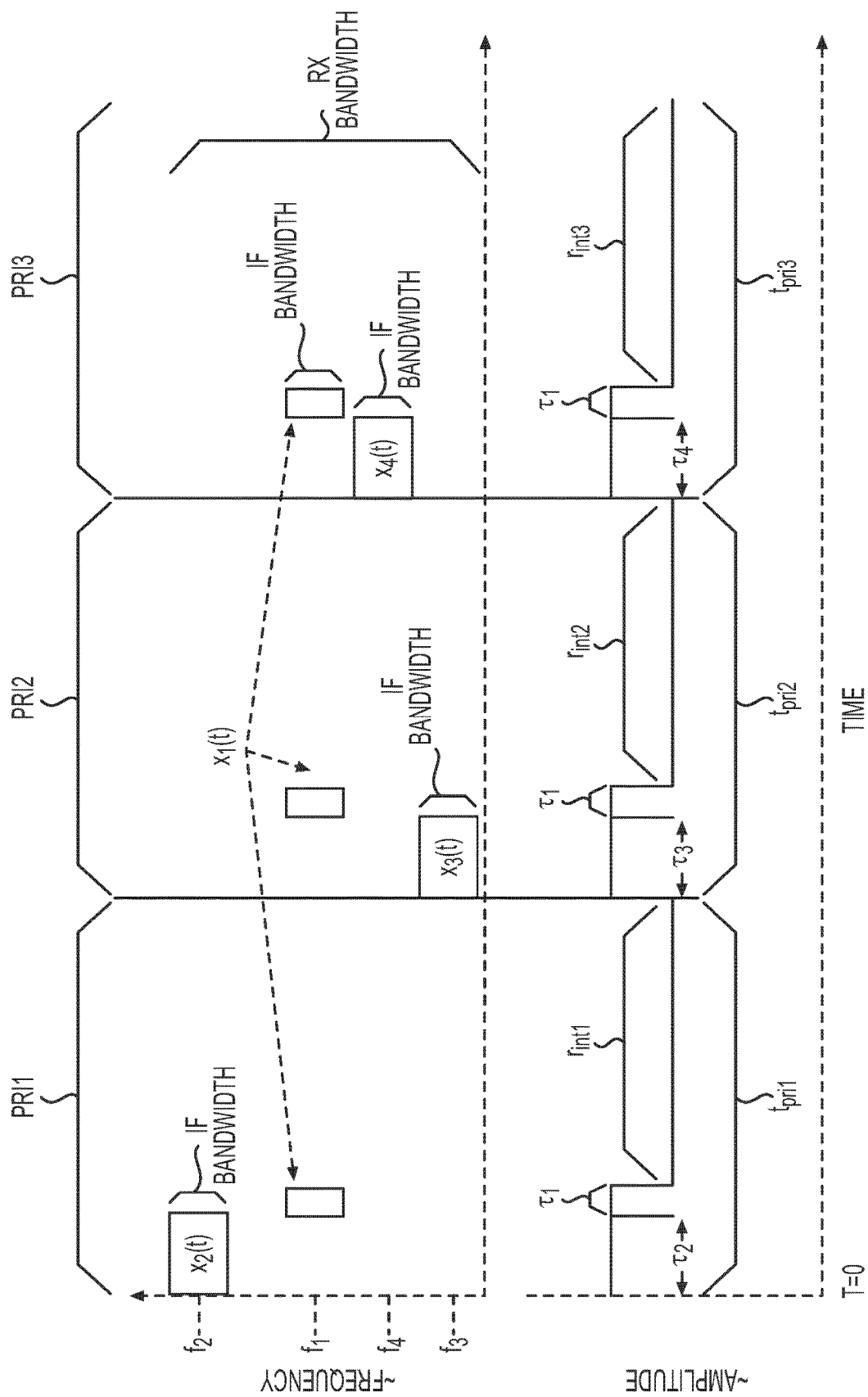
FIG. 4 depicts exemplary signals and sensor timing with which the disclosed subject matter can be embodied.

FIG. 4 depicts exemplary signals and sensor timing with which the disclosed subject matter can be embodied. Example radar signals $x_1(t)$, $x_2(t)$, $x_3(t)$ and $x_4(t)$, representatively referred to herein as signal(s) $x_k(t)$, are transmitted as sub-pulses in each of PRI1, PRI2 and PRI3. As used herein, a "sub-pulse" is a pulsed waveform that is transmitted in a single PRI with at least one other sub-pulse. As illustrated in the figure, each sub-pulse has a pulse length $\tau_k$ and a carrier frequency $f_k$ among other signal characteristics, such as pulse compression. In one embodiment, RF carrier frequency is nominally about 4 GHz, with each sub-pulse being separated by at least 100 MHz. It is to be understood that while the example utilizes four (4) radar signals $x_k(t)$, the disclosed subject matter is not so limited. Indeed, the number of radar signals $x_k(t)$ may be user selectable in certain embodiments.

Each sub-pulse may have characteristics imparted thereon, such as by waveform generator 322, so that radar returns of corresponding transmitted sub-pulses are distinguishable one from another. Such signal characteristics may enable segregation of the radar returns, which are then provided to corresponding detection processing chains 332. The sub-pulses in each PRI may be temporally adjacent and/or frequency-separated pulse-shaped waveforms.

As illustrated in FIG. 4, a radar dwell may encompass multiple PRIs, e.g., PRI1, PRI2 and PRI3 having interval lengths $t_{PR/1}$, $t_{PR/2}$ and $t_{PR/3}$, respectively. Corresponding receive intervals $r_{int1}(t)$, $r_{int2}(t)$ and $r_{int3}(t)$, representatively referred to herein as $r_{intk}(t)$, are included in each PRI, during which radio resources are configured to receive radar returns of $x_k(t)$.

As is illustrated in FIG. 4, signal $x_1(t)$ comprises a sub-pulse at a common carrier frequency for every PRI in the radar dwell, while $x_2(t)$-$x_4(t)$ each comprise a single sub-pulse for the radar dwell and have different carrier frequencies in each PRI. Accordingly, over the entire dwell, the sub-pulses of $x_1(t)$ may be coherently integrated one with the others and the sub-pulses of $x_2(t)$-$x_4(t)$ may be non-coherently integrated to cover a relatively wide frequency band.

Figure 5:
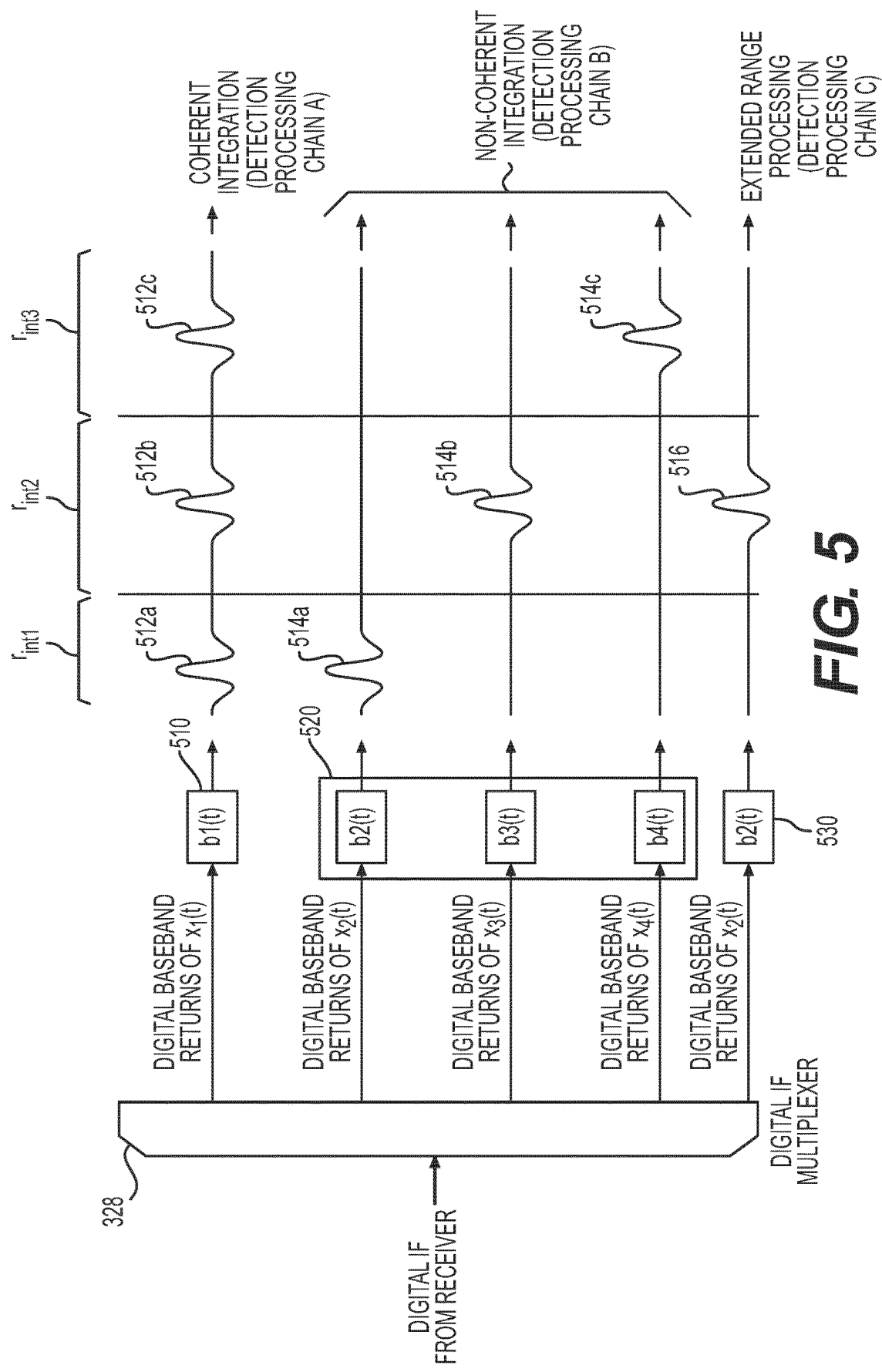
FIG. 5 is a diagram illustrating example signal processing aspects of an embodiment of the disclosed subject matter.

FIG. 5 is a diagram illustrating example signal processing aspects of an embodiment of the disclosed subject matter. It is to be assumed that the radar return signals described with reference to FIG. 5 correspond to the transmitted signals described with reference to FIG. 4.

In WB receiver 326, radar returns are digitized and downconverted to digital IF, which are then provided to digital IF multiplexer 328. Digital IF multiplexer 328 may downconvert the radar returns to baseband and de-multiplex the returns into corresponding detection processing chains 332, which are designated detection processing chains A-C in FIG. 5. Such multiplexing may proceed by distinguishing the signal characteristics of each $x_k(t)$ e.g., the RF carrier on which each signal $x_k(t)$ was transmitted.

Digital baseband returns of $x_k(t)$ may be provided to detection processing chains A-C based on a selected integration scheme across receive intervals $r_{intk}(t)$. For example, the baseband radar returns of $x_1(t)$ are provided to a pulse compression component 510 of detection processing chain A. A filter $b1(t)$ may be implemented in pulse compression component 510 that is matched to a modulation scheme (e.g., pulse compression) imparted on $x_1(t)$. The output of pulse compression component 510 is a filtered pulse corresponding to the radar returns received in each of receive interval $r_{intk}(t)$. That is, filtered pulse 512a corresponds to a radar signal transmitted in PRI1 and received as a radar return in the corresponding receive interval $r_{int1}(t)$, filtered pulse 512b corresponds to a radar signal transmitted in PRI2 and received as a radar return in the corresponding receive interval $r_{int2}(t)$, and filtered pulse 512c corresponds to a radar signal transmitted in PRI3 and received as a radar return in the corresponding receive interval $r_{int3}(t)$. Filtered pulses 512a-512c may be provided to coherent processing component 343 of detection processing chain A, where they are coherently integrated across receive intervals. The integrated results may then be provided to detection processing component 346 and estimation component 348 of detection processing chain A.

Another detection processing chain, detection processing chain B, may be configured for non-coherent integration. As illustrated in FIG. 5, digital baseband returns of $x_2(t)$ are provided to a filter $b2(t)$ of a pulse compression component 520, digital baseband returns of $x_3(t)$ are provided to a filter $b3(t)$ of pulse compression component 520, and digital baseband returns of $x_4(t)$ are provided to a filter $b4(t)$ of pulse compression component 520. The output of pulse compression component 520 are filtered pulses 514a-514c: filtered pulse 514a corresponds to a radar signal transmitted in PRI1 and received as a radar return in the corresponding receive interval $r_{int1}(t)$, filtered pulse 514b corresponds to a radar signal transmitted in PRI2 and received as a radar return in the corresponding receive interval $r_{int2}(t)$, and filtered pulse 512c corresponds to a radar signal transmitted in PRI3 and received as a radar return in the corresponding receive interval $r_{int3}(t)$. Filtered pulses 514a-514c may be provided to non-coherent processing component 344 of detection processing chain B, where they are non-coherently integrated across receive intervals. The integrated results may be provided to detection processing component 346 and estimation component 348 of detection processing chain B.

Another detection processing chain, detection processing chain C, may be configured for extended range operation. In such configuration, digital baseband returns of a radar signal transmitted in one PRI may be obtained in the receive interval of a subsequent PRI. In the illustrated example, digital baseband returns of $x_2(t)$ are provided to a pulse compression component 530 implementing filter $b2(t)$, which produces filtered pulse 516.

Figure 6:
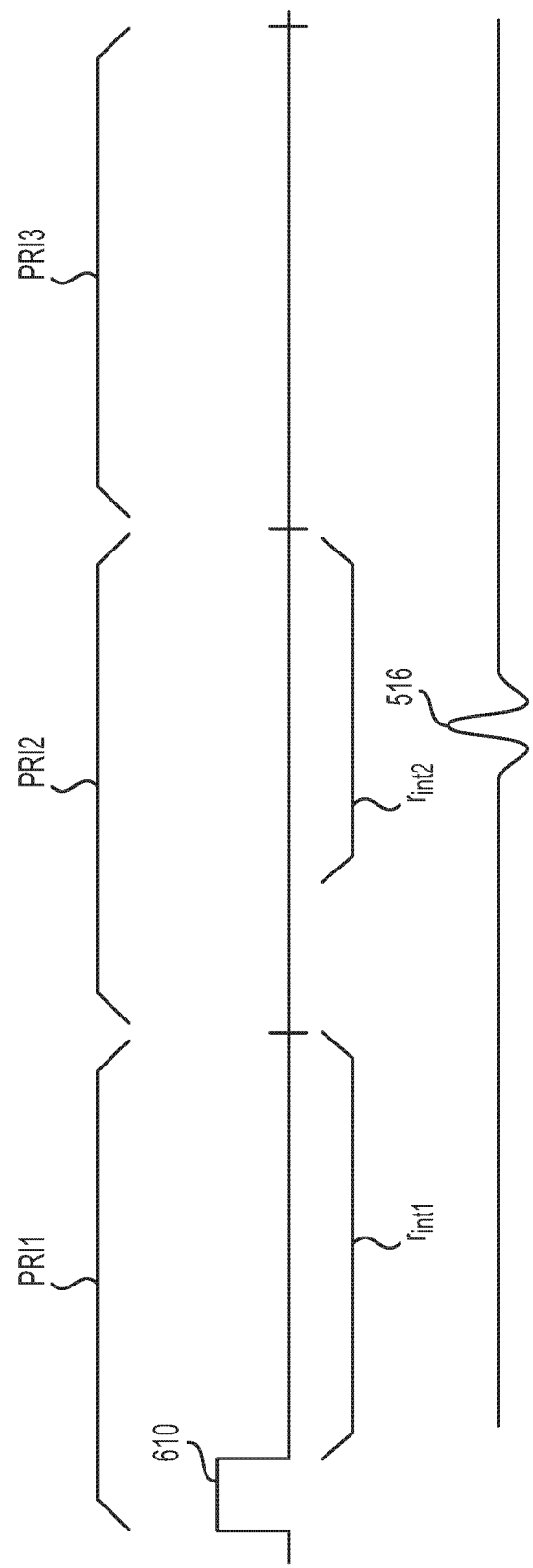
FIG. 6 is a diagram illustrating extended range features of embodiments of the disclosed subject matter.

FIG. 6 is a diagram further illustrating extended range features of embodiments of the disclosed subject matter. A sub-pulse 610 of, say, $x_2(t)$, may be transmitted at the onset of PRI1 (the additional sub-pulse of PRI1, e.g., $x_1(t)$, as well as the frequency separated sub-pulses of PRI2 and PRI3, e.g., $x_3(t)$ and $x_4(t)$, have been omitted from FIG. 6 for purposes of clarity). Conventionally, unambiguous range to target may be determined from radar return signals from sub-pulse 610 that arrive within the receive interval $r_{int1}$. It is to be observed from FIG. 4 that no other sub-pulse coincides in frequency with sub-pulse 610 subsequent to sub-pulse 610. Embodiments of the disclosed subject matter can thus determine an unambiguous range to target from a radar return signal that arrives in a subsequent PRI than that containing $r_{int1}$, e.g., filtered pulse 516 in receive interval $r_{int2}$ of PRI2. That is, digital IF multiplexer 328 will provide radar return signal 516 to its corresponding detection processing chain, which calculates the range to target noting the extended period of time over which the sub-pulse has traveled. In certain embodiments, WB receiver 326 may be configured to "listen" for radar returns across frequencies and receive intervals $r_{intk}(t)$ simultaneously.

FIGS. 5 and 6 demonstrate a single case of extended range processing according to embodiments of the present disclosure. However, it is to be understood that similar processing can be performed in other detection processing chains and in other receive intervals. Additionally, while processing chain C is illustrated as processing a single pulse, it can also non-coherently integrate over multiple pulse returns.

Figure 7:
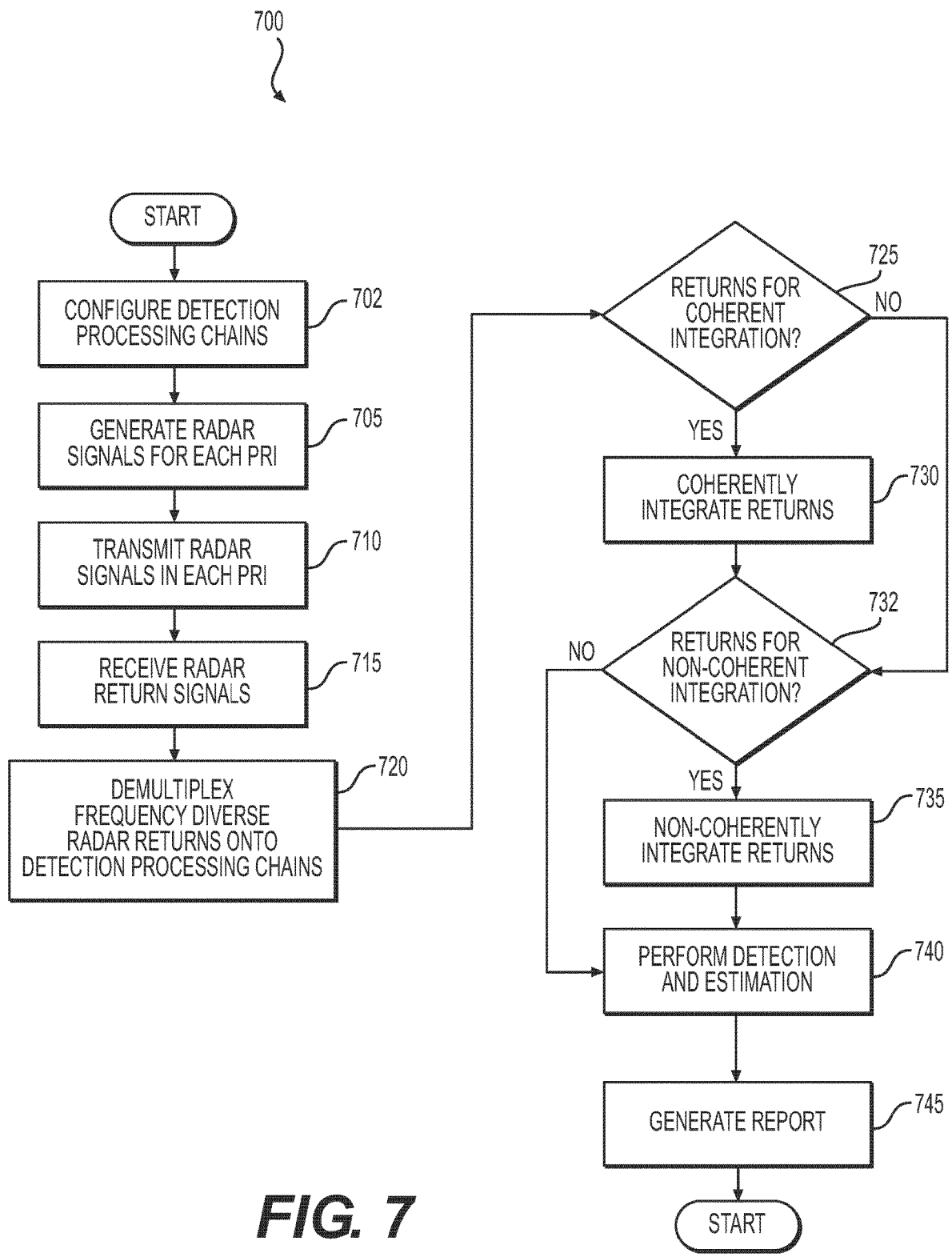
FIG. 7 is a flow diagram illustrating an exemplary radar process by which the disclosed subject matter can be embodied.

FIG. 7 is a flow diagram illustrating an exemplary radar process 700 by which the disclosed subject matter can be embodied. In operation 702, detection processing chains are configured for processing the radar returns of the various transmitted radar signals, such as described above. In operation 705, radar signals are generated for each PRI, such as by waveform generator 322, according to the configuration established in operation 702. In operation 710, the generated radar signals are transmitted from WB antenna 324 in each PRI. In operation 715, radar returns are received by receiver 326 and, in operation 720, the frequency diverse radar return signals are de-multiplexed by digital IF multiplexer 328 onto detection processing chains 332 according to the configuration established in operation 702. In operation 725, it is determined whether the radar returns are destined for coherent integration and, if so, process 700 transitions to operation 730, by which coherent processing is performed on the radar returns. If, however, the radar return signals are not destined for coherent integration, as determined in operation 725, process 700 transitions to operation 732 by which it is determined whether the radar returns are destined for non-coherent integration. If so, process 700 transitions to operation 735, by which non-coherent integration is performed on the radar returns. In operation 740, radar detection and estimation are performed and, in operation 745, a report is generated, such as by report processing component 350 in which a range to target is indicated.

As will be appreciated by one skilled in the art, aspects of the disclosed subject matter may be embodied as a system, method or computer program product. Accordingly, aspects of the disclosed subject matter may take the form of an entirely hardware embodiment or an embodiment combining software and hardware aspects that may all generally be referred to herein as a "component," "circuit," "module" or "system." Furthermore, aspects of the disclosed subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a solid state disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, a phase change memory storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the disclosed subject matter may be written in any combination of one or more programming languages, e.g., an object oriented programming language such as Java, Smalltalk, C++ or the like, or a conventional procedural programming language, such as the "C" programming language or similar programming languages. Further, any references herein of software performing various functions generally refer to computer systems or processors performing those functions under software/firmware control.

Aspects of the disclosed subject matter are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a programmable data processing apparatus to produce a machine, such that the instructions, which execute via the processor of the programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of machine operations to be performed on the computer, other programmable apparatus or other devices to produce a computer implemented process that implements the functions/acts specified in the flowchart and/or block diagram block or blocks.

The flowchart and block diagrams in the figures illustrate the architecture, functionality, and operation of possible implementations of systems, method and computer program products according to various embodiments of the disclosed subject matter. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending on the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more features, integers, steps, operations, elements, components, and/or groups thereof.

Embodiments of the disclosed subject matter may also be as set forth according to the parentheticals in the following paragraphs.

(1) A radar apparatus comprising: a waveform generator configured to generate radar signals having signal characteristics that define multiple sub-pulses in each of a plurality of pulse repetition intervals (PRIs) of a single radar dwell; an antenna communicatively coupled to the waveform generator and configured to emit electromagnetic radiation according to the radar signals; a receiver communicatively coupled to the antenna and configured to sense the emitted electromagnetic radiation as radar return signals over a receive interval in each PRI; and a signal processor communicatively coupled to the receiver and configured to perform coherent integration on a set of the radar return signals and non-coherent integration on another set of the radar return signals.

(2) The radar apparatus of (1), wherein the signal characteristics establish a set of the sub-pulses that are at a constant carrier frequency across the PRIs of the radar dwell, and another set of the sub-pulses are separated in frequency across the PRIs of the radar dwell.

(3) The radar apparatus of (1) or (2) further comprising a multiplexer communicatively coupled to the receiver and configured to: separate the radar return signals in accordance with the signal characteristics of the corresponding sub-pulses; and provide the separated radar return signals to respective detection processing chains in which the radar return signals corresponding to the constant carrier sub-pulses are coherently integrated and the radar return signals corresponding to the frequency-separated sub-pulses are non-coherently integrated.

(4) The radar apparatus of any one of (1) to (3), wherein the signal characteristics include pulse compression modulation and the detection processing chains include respective filters matched to the pulse compression modulation of each sub-pulse.

(5) The radar apparatus of any one of (1) to (4), wherein the detection processing chains determine an unambiguous range to target from radar return signals that arrive subsequent to the receive interval of at least one PRI in which the corresponding sub-pulse was transmitted.

(6) The radar apparatus of any one of (1) to (5), wherein the sub-pulses in each PRI are temporally adjacent.

(7) The radar apparatus of any one of (1) to (6), wherein the sub-pulses in each PRI are frequency-separated.

(8) A radar method comprising: generating radar signals having signal characteristics that define multiple sub-pulses in each of a plurality of pulse repetition intervals (PRIs) of a single radar dwell, the signal characteristics establishing a set of the sub-pulses that are at a constant carrier frequency across the PRIs of the radar dwell, and another set of the sub-pulses are separated in frequency across the PRIs of the radar dwell; emitting electromagnetic radiation according to the radar signals; sensing the emitted electromagnetic radiation as radar return signals over a receive interval in each PRI; and performing coherent integration on a set of the radar return signals and non-coherent integration on another set of the radar return signals.

(9) The radar method of (8) further comprising: separating the radar return signals in accordance with the signal characteristics of the corresponding sub-pulses; coherently integrating the radar return signals corresponding to the constant carrier sub-pulses; and non-coherently integrating the radar return signals corresponding to the frequency-separated sub-pulses.

(10) The radar method of (8) or (9) further comprising: filtering the radar return signals with filters matched to pulse compression modulation imparted on each sub-pulse.

(11) The radar method of any one of (8) to (10) further comprising: determining an unambiguous range to target from radar return signals that arrive subsequent to the receive interval of at least one PRI in which the corresponding sub-pulse was transmitted.

(12) The radar method of any one of (8) to (11), wherein the sub-pulses in each PRI are temporally adjacent.

(13) The radar method of any one of (8) to (12), wherein the sub-pulses in each PRI are frequency-separated.

(14) A tangible, non-transitory computer readable medium having encoded thereon processor instructions that when executed by one or more processors of a radar compels the radar to: generate radar signals having signal characteristics that define multiple sub-pulses in each of a plurality of pulse repetition intervals (PRIs) of a single radar dwell; emit electromagnetic radiation according to the radar signals; sense the emitted electromagnetic radiation as radar return signals over a receive interval in each PRI; and perform coherent integration on a set of the radar return signals and non-coherent integration on another set of the radar return signals.

(15) The computer readable medium of (14) further comprising processor instructions that when executed by the one or more processors of the radar compels the radar to: establish by the signal characteristics a set of the sub-pulses that are at a constant carrier frequency across the PRIs of the radar dwell and another set of the sub-pulses are separated in frequency across the PRIs of the radar dwell.

(16) The computer readable medium of (14) or (15) further comprising processor instructions that when executed by the one or more processors of the radar compels the radar to: separate the radar return signals in accordance with the signal characteristics of the corresponding sub-pulses; coherently integrate the radar return signals corresponding to the constant carrier sub-pulses; and non-coherently integrate the radar return signals corresponding to the frequency-separated sub-pulses.

(17) The computer readable medium of any one of (14) to (16) further comprising processor instructions that when executed by the one or more processors of the radar compels the radar to: filter the radar return signals with filters matched to pulse compression modulation imparted on each sub-pulse.

(18) The computer readable medium of any one of (14) to (17) further comprising processor instructions that when executed by the one or more processors of the radar compels the radar to: determine an unambiguous range to target from radar return signals that arrive subsequent to the receive interval of at least one PRI in which the corresponding sub-pulse was transmitted.

(19) The computer readable medium of any one of (14) to (18), wherein the sub-pulses in each PRI are temporally adjacent.

(20) The computer readable medium of any one of (14) to (19), wherein the sub-pulses in each PRI are frequency-separated.

The descriptions above are intended to illustrate possible implementations of the present inventive concept and are not restrictive. Many variations, modifications and alternatives will become apparent to the skilled artisan upon review of this disclosure. For example, components equivalent to those shown and described may be substituted therefore, elements and methods individually described may be combined, and elements described as discrete may be distributed across many components. The scope of the invention should therefore be determined not with reference to the description above, but with reference to the appended claims, along with their full range of equivalents.

The invention claimed is:

1. A radar apparatus comprising:
a waveform generator configured to generate radar signals having signal characteristics that define multiple sub-pulses in each of a plurality of pulse repetition intervals (PRIs) of a single radar dwell;
an antenna communicatively coupled to the waveform generator and configured to emit electromagnetic radiation according to the radar signals;

a receiver communicatively coupled to the antenna and configured to sense the emitted electromagnetic radiation as radar return signals over a receive interval in each PRI; and a signal processor communicatively coupled to the receiver and configured to perform coherent integration on a set of the radar return signals and non-coherent integration on another set of the radar return signals.

2. The radar apparatus of claim 1, wherein the signal characteristics establish a set of the sub-pulses that are at a constant carrier frequency across the PRIs of the radar dwell, and another set of the sub-pulses are separated in frequency across the PRIs of the radar dwell.

3. The radar apparatus of claim 2 further comprising a multiplexer communicatively coupled to the receiver and configured to:

separate the radar return signals in accordance with the signal characteristics of the corresponding sub-pulses; and provide the separated radar return signals to respective detection processing chains in which the radar return signals corresponding to the constant carrier sub-pulses are coherently integrated and the radar return signals corresponding to the frequency-separated sub-pulses are non-coherently integrated.

4. The radar apparatus of claim 3, wherein the signal characteristics include pulse compression modulation and the detection processing chains include respective filters matched to the pulse compression modulation of each sub-pulse.

5. The radar apparatus of claim 3, wherein the detection processing chains determine an unambiguous range to target from radar return signals that arrive subsequent to the receive interval of at least one PRI in which the corresponding sub-pulse was transmitted.

6. The radar apparatus of claim 1, wherein the sub-pulses in each PRI are temporally adjacent.

7. The radar apparatus of claim 6, wherein the sub-pulses in each PRI are frequency-separated.

8. A radar method comprising:

generating radar signals having signal characteristics that define multiple sub-pulses in each of a plurality of pulse repetition intervals (PRIs) of a single radar dwell, the signal characteristics establishing a set of the sub-pulses that are at a constant carrier frequency across the PRIs of the radar dwell, and another set of the sub-pulses are separated in frequency across the PRIs of the radar dwell;

emitting electromagnetic radiation according to the radar signals;

sensing the emitted electromagnetic radiation as radar return signals over a receive interval in each PRI; and performing coherent integration on a set of the radar return signals and non-coherent integration on another set of the radar return signals.

9. The radar method of claim 8 further comprising:

separating the radar return signals in accordance with the signal characteristics of the corresponding sub-pulses;

coherently integrating the radar return signals corresponding to the constant carrier sub-pulses; and non-coherently integrating the radar return signals corresponding to the frequency-separated sub-pulses.

10. The radar method of claim 9 further comprising:

filtering the radar return signals with filters matched to pulse compression modulation imparted on each sub-pulse.

11. The radar method of claim 9 further comprising:

determining an unambiguous range to target from radar return signals that arrive subsequent to the receive interval of at least one PRI in which the corresponding sub-pulse was transmitted.

12. The radar method of claim 8, wherein the sub-pulses in each PRI are temporally adjacent.

13. The radar method of claim 12, wherein the sub-pulses in each PRI are frequency-separated.

14. A tangible, non-transitory computer readable medium having encoded thereon processor instructions that when executed by one or more processors of a radar compels the radar to:

generate radar signals having signal characteristics that define multiple sub-pulses in each of a plurality of pulse repetition intervals (PRIs) of a single radar dwell;

emit electromagnetic radiation according to the radar signals;

sense the emitted electromagnetic radiation as radar return signals over a receive interval in each PRI; and perform coherent integration on a set of the radar return signals and non-coherent integration on another set of the radar return signals.

15. The computer readable medium of claim 14 further comprising processor instructions that when executed by the one or more processors of the radar compels the radar to:

establish by the signal characteristics a set of the sub-pulses that are at a constant carrier frequency across the PRIs of the radar dwell and another set of the sub-pulses are separated in frequency across the PRIs of the radar dwell.

16. The computer readable medium of claim 15 further comprising processor instructions that when executed by the one or more processors of the radar compels the radar to:

separate the radar return signals in accordance with the signal characteristics of the corresponding sub-pulses;

coherently integrate the radar return signals corresponding to the constant carrier sub-pulses; and non-coherently integrate the radar return signals corresponding to the frequency-separated sub-pulses.

17. The computer readable medium of claim 16 further comprising processor instructions that when executed by the one or more processors of the radar compels the radar to:

filter the radar return signals with filters matched to pulse compression modulation imparted on each sub-pulse.

18. The computer readable medium of claim 16 further comprising processor instructions that when executed by the one or more processors of the radar compels the radar to:

determine an unambiguous range to target from radar return signals that arrive subsequent to the receive interval of at least one PRI in which the corresponding sub-pulse was transmitted.

19. The computer readable medium of claim 14, wherein the sub-pulses in each PRI are temporally adjacent.

20. The computer readable medium of claim 14, wherein the sub-pulses in each PRI are frequency-separated.

* * * * *